(12) United States Patent
Merlo et al.

(10) Patent No.: US 8,409,766 B2
(45) Date of Patent: Apr. 2, 2013

(54) FLUOROIONOMER LIQUID COMPOSITION

(75) Inventors: Luca Merlo, Montorfano (IT); Alessandro Ghielmi, Milan (IT)

(73) Assignee: Solvay Solexis, S.p.A., Bollate (IT)

( * ) Notice: Subject to any disclaimer, the term of this patent is extended or adjusted under 35 U.S.C. 154(b) by 378 days.

(21) Appl. No.: 12/743,507

(22) PCT Filed: Nov. 25, 2008

(86) PCT No.: PCT/EP2008/066152
§ 371 (c)(1), (2), (4) Date: May 18, 2010

(87) PCT Pub. No.: WO2009/068528
PCT Pub. Date: Jun. 4, 2009

(65) Prior Publication Data
US 2010/0297523 A1    Nov. 25, 2010

(30) Foreign Application Priority Data

Nov. 26, 2007 (EP) .................................. 07121502

(51) Int. Cl.
- *H01M 8/10* (2006.01)
- *B01J 49/00* (2006.01)
- *C08J 5/20* (2006.01)

(52) U.S. Cl. .......................................... 429/494; 521/27

(58) Field of Classification Search .................. 429/479, 429/483, 484, 491–494, 498; 521/27, 28
See application file for complete search history.

(56) References Cited

U.S. PATENT DOCUMENTS

| | | | |
|---|---|---|---|
| 4,176,215 A | 11/1979 | Molnar et al. | |
| 4,414,338 A | 11/1983 | Kimoto et al. | |
| 4,426,271 A | 1/1984 | Yoshida et al. | |
| 4,433,082 A | 2/1984 | Grot | |
| 6,150,047 A | 11/2000 | Yen et al. | |
| 6,150,426 A | 11/2000 | Curtin et al. | |
| 2004/0053111 A1 | 3/2004 | Matsumoto | |
| 2005/0043487 A1 | 2/2005 | Felix et al. | |
| 2005/0186467 A1 | 8/2005 | Sugiura | |
| 2006/0083971 A1 | 4/2006 | DeSimone et al. | |

FOREIGN PATENT DOCUMENTS

| | | |
|---|---|---|
| EP | 166166 A1 | 1/1986 |
| EP | 498076 A1 | 8/1992 |
| EP | 1004615 A2 | 5/2000 |
| GB | 1286859 | 8/1972 |
| JP | 10284087 A | 10/1998 |
| JP | 11288727 A | 10/1999 |
| WO | WO9713287 A2 | 4/1997 |
| WO | WO2005045978 A2 | 5/2005 |
| WO | WO2008077894 A1 | 7/2008 |

OTHER PUBLICATIONS

Zaluski C. and Xu G. "Blends of Nafion and Dow perfluorosulfonated ionomer membranes", Macromolecules, 1994, vol. 27(23), p. 6750-6754, ACS, Washington DC, US—XP002357596 ; 5 pgs.

Standard ASTM D3418-82, "Standard test method for transition temperatures of polymers by thermal analysis", Jan. 1, 1982, p. 867-872—XP001537767 ; 6 pgs.

*Primary Examiner* — Carlos Barcena
(74) *Attorney, Agent, or Firm* — Arent Fox LLP

(57) ABSTRACT

A liquid composition comprising:
- at least one fluoroionomer (I) [fluoroionomer (I-1)], the fluoroionomer (I-1) having a heat of fusion comprised between 4 and 20 J/g; and
- at least one fluoroionomer (I) [fluoroionomer (I-2)], the fluoroionomer (I-2) being substantially amorphous, that is to say having a heat of fusion of less than 4 J/g, and wherein the water extractable fraction of the fluoroionomer (I-2) is less than 40% wt, the liquid composition comprising the fluoroionomer (I-1) and the fluoroionomer (I-2) in a weight ratio (I-1)/(I-2) of at least 2:1.

13 Claims, No Drawings

FLUOROIONOMER LIQUID COMPOSITION

CROSS-REFERENCE TO RELATED APPLICATIONS

This application is a U.S. national stage application under 35 U.S.C. §371 of International Application No. PCT/EP2008/066152 filed Nov. 25, 2008, which claims priority to European Patent Application No. 07121502.4 filed Nov. 26, 2007, this application being incorporated herein by reference in its entirety for all purposes.

TECHNICAL FIELD

The present invention relates to liquid compositions comprising fluoroionomers, a process for making such compositions and products made using such compositions.

BACKGROUND ART

Liquid compositions of perfluorinated ion exchange polymers are known for use in the manufacture and repair of ion exchange membranes, for membrane coatings containing conductive and non-conductive particles, and for many other uses. While such compositions are sometimes referred to as solutions, the compositions are generally recognized as being dispersions of polymer particles.

Liquid compositions are typically prepared by suspending in an appropriate aqueous or aqueous-alcoholic medium the perfluorinated ion exchange polymer. Methods useful for obtaining such liquid dispersions are notably taught in U.S. Pat. No. 4,433,082 (DUPONT DE NEMOURS) 21 Feb. 1984, GB 1286859 (DU PONT) 23 Aug. 1972, EP 1004615 A (AUSIMONT S.P.A.) 31 May 2000 and U.S. Pat. No. 6,150,426 (DUPONT DE NEMOURS) 21 Nov. 2000.

Nevertheless, the liquid compositions of the prior art possess limited film-forming capabilities. In particular, due to their high viscosities in the liquid state and their poor tixotropic and/or rheological behaviour, formation of thick coatings is not possible. In other words, critical film thickness above which film quality is unsatisfactory is limited, so that several repeated coating/casting steps are required for obtaining final target thicknesses in the membrane.

Pastes or electrode forming compositions comprising ionomers of different equivalent weight are also known in the art.

Thus, JP 10284087 (ASAHI CHEMICAL IND) 23 Oct. 1998 discloses a fuel cell wherein the catalyst layer is made from a paste comprising at least two different fluoroionomers having different EW, for improving water removal from electrodes. According to this document, the two perfluoroionomers shall be selected to have a difference in equivalent weight (EW, hereinafter) of at most 800, and at least 20.

US 2004053111 (ASAHI CHEMICAL IND.) 18 Mar. 2004 discloses an electrode for solid polymer electrolyte fuel cell wherein electrocatalyst particles are covered with a first ionomer (so-called "primary presence state" (1)) and said "coated" particles are binded together by a second ionomer (so-called "secondary presence state" (2)), that is to say that the so-manufactured electrode comprises two ionomers having different EW. Equivalent weights of said ionomers are selected according to this document so as (1) possesses an EW of 500 to 1000; and (2) possesses an EW of 850 to 1500. The electrodes according to this document are prepared by first mixing the catalyst (e.g. Pt supported on C) with the perfluorocarbon sulfonic acid of type (1) in a $H_2O$/solvent mixture; then the so-obtained paste is again mixed with the perfluorosulfonic acid of type (2) in the same medium.

US 2005043487 (DUPONT DE NEMOURS) 24 Feb. 2005 discloses fluoropolymer compositions suitable for providing membranes for fuel cells by extrusion moulding, said composition comprising from 70 to 95 wt. % of a fluorinated ionomer; and from 30 to 5 wt. % of at least two melt processible fluoropolymers substantially free of ion-exchange groups, differing each other in melting point by at least 5° C. This document teaches that the fluorinated ionomers differ from each other by their equivalent weights. Thus, examples relate to mixtures of fluoroionomers (copolymers of TFE and perfluoro(3,6-dioxa-4-methyl-7-octenesulfonyl fluoride) having an EW of, respectively, 1000 and 920, in combination with FEP and PFA used for manufacturing membranes by extrusion moulding.

US 2005186467 (ASAHI KASEI) 25 Aug. 2005 discloses an electrode for a polymer electrolyte fuel cell, wherein the catalyst layer is manufactured by application of a catalyst paste, said paste containing supported catalyst particles and an electrolytic composition in which electrolytes of different equivalent weight are dissolved or dispersed.

None of the pastes of the prior art could provide for good filmability properties in combination with appreciable behaviour in fuel cells operations.

There is thus a current shortfall for liquid dispersions suitable for forming films, said dispersions having outstanding filmability properties, and films produced therefrom having valuable behaviour in fuel cells operations, with virtually no failure and substantial reduction of hydrogen cross-over phenomena during operations.

DISCLOSURE OF INVENTION

It is thus an object of the present invention a liquid composition comprising:
- at least one fluoroionomer (I) [fluoroionomer (I-1)], said fluoroionomer (I-1) having a heat of fusion comprised between 4 and 20 J/g;
- at least one fluoroionomer (I) [fluoroionomer (I-2)], said fluoroionomer (I-2) being substantially amorphous, that is to say having a heat of fusion of less than 4 J/g, and wherein the water extractable fraction of fluoronomer (I-2) is less than 40% wt, said liquid composition comprising fluoroionomer (I-1) and fluoroionomer (I-2) in a weight ratio (I-1)/(I-2) of at least 2:1.

The Applicant has found that the proper selection of the fluoroionomers (I-1) and (I-2) as above described in mentioned weight ratio is effective in both providing liquid compositions having outstanding filmability behaviour in membrane casting, but also in yielding, by casting, membranes which can be used with success in fuel cells, with no risk of failure nor of hydrogen crossover for long operations times in fuel cells.

The Applicant thinks, without this limiting the scope of the invention, that the substantially amorphous fluoroionomer (I-2) aids in dispersing the fluoroionomer (I-1) in the liquid medium, while the presence of the semi-crystalline fluoroionomer (I-1) enables achievement of targeted behaviour of membranes therefrom.

The Applicant has also surprisingly found that it is essential for the substantially amorphous fluoroionomer (I-2) to have a water extractable fraction of less than 40% for maintaining outstanding behaviour in fuel cell operations.

Within the context of the present invention the mentions "at least one fluoroionomer (I-1)" and "at least one fluoroionomer (I-2)" is intended to denote one or more than one fluoroionomer (I-1) or (I-2) Mixtures of fluoroionomers (I-1) and/or mixtures of fluoroionomer (I-2) can be advantageously used for the purposes of the invention.

In the rest of the text, the expressions "fluoroionomer (I-1)" and "fluoroionomer (I-2)" are understood, for the purposes of the present invention, both in the plural and the singular, that is to say that the inventive composition may comprise one or more than one fluoroionomer (I-1) and/or one or more than one fluoroionomer (I-2).

Fluoroionomer (I-1) and fluoroionomer (I-2) are fluoroionomers (I), that is to say that all features described here below for fluoroionomer (I) apply both but independently to fluoroionomer (I-1) and fluoroionomer (I-2).

To the purpose of the present invention, the term "fluoroionomer (I)" is intended to denote any polymer comprising:
recurring units derived from at least one ethylenically unsaturated monomer comprising at least one fluorine atom (fluorinated monomer, hereinafter); and
a substantial amount of recurring units derived from at least one ethylenically unsaturated monomer comprising at least one cation exchange group (functional monomer, hereinafter).

The term "at least one ethylenically unsaturated monomer comprising at least one fluorine atom [fluorinated monomer]" is understood to mean that the fluoroionomer can comprise recurring units derived from one or more than one fluorinated monomer.

In the rest of the text, the expression "fluorinated monomer" is understood, for the purposes of the present invention, both in the plural and the singular.

The fluorinated monomer can further comprise one or more other halogen atoms (Cl, Br, I). Shall the fluorinated monomer be free of hydrogen atom, it is designated as per(halo)fluoromonomer. Shall the fluorinated monomer comprise at least one hydrogen atom, it is designated as hydrogen-containing fluorinated monomer.

Non limitative examples of fluorinated monomers are notably tetrafluoroethylene (TFE), vinylidene fluoride (VdF), chlorotrifluoroethylene (CTFE), and mixtures thereof.

Optionally, the fluoroionomer may comprise recurring units derived from one first monomer, said monomer being a fluorinated monomer as above described, and at least one other monomer [comonomer (CM), hereinafter].

Hereinafter, the term comonomer (CM) should be intended to encompass both one comonomer and two or more comonomers.

The comonomer (CM) can notably be either hydrogenated (i.e. free of fluorine atom) [comonomer (HCM), hereinafter] or fluorinated (i.e. containing at least one fluorine atom) [comonomer (FCM), hereinafter].

Non limitative examples of suitable hydrogenated comonomers (HCM) are notably ethylene, propylene, vinyl monomers such as vinyl acetate, acrylic monomers, like methyl methacrylate, acrylic acid, methacrylic acid and hydroxyethyl acrylate, as well as styrene monomers, like styrene and p-methylstyrene.

Non limitative examples of suitable fluorinated comonomers (FCM) are notably:
$C_3$-$C_8$ fluoro- and/or perfluoroolefins, such as hexafluoropropene, pentafluoropropylene, and hexafluoroisobutylene;
$C_2$-$C_8$ hydrogenated monofluoroolefins, such as vinyl fluoride;
1,2-difluoroethylene, vinylidene fluoride and trifluoroethylene;
perfluoroalkylethylenes complying with formula $CH_2$=$CH$—$R_{f0}$, in which $R_{f0}$ is a $C_1$-$C_6$ perfluoroalkyl;
chloro- and/or bromo- and/or iodo-$C_2$-$C_6$ fluoroolefins, like chlorotrifluoroethylene;
fluoroalkylvinylethers complying with formula $CF_2$=$CFOR_{f1}$ in which $R_{f1}$ is a $C_1$-$C_6$ fluoro- or perfluoroalkyl, e.g. —$CF_3$, —$C_2F_5$, —$C_3F_7$;
fluoro-oxyalkylvinylethers complying with formula $CF_2$=$CFOX_0$, in which $X_0$ is a $C_1$-$C_{12}$ oxyalkyl, or a $C_1$-$C_{12}$ (per)fluorooxyalkyl having one or more ether groups, like perfluoro-2-propoxy-propyl;
fluoroalkyl-methoxy-vinylethers complying with formula $CF_2$=$CFOCF_2OR_{f2}$ in which $R_{f2}$ is a $C_1$-$C_6$ fluoro- or perfluoroalkyl, e.g. —$CF_3$, —$C_2F_5$, —$C_3F_7$ or a $C_1$-$C_6$ (per)fluorooxyalkyl having one or more ether groups, like —$C_2F_5$—O—$CF_3$;
fluorodioxoles, of formula:

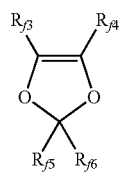

wherein each of $R_{f3}$, $R_{f4}$, $R_{f5}$, $R_{f6}$, equal or different each other, is independently a fluorine atom, a $C_1$-$C_6$ fluoro- or per(halo)fluoroalkyl, optionally comprising one or more oxygen atom, e.g. —$CF_3$, —$C_2F_5$, —$C_3F_7$, —$OCF_3$, —$OCF_2CF_2OCF_3$.

The term "substantial amount" in the definition here above is intended to denote an amount of recurring units derived from the functional monomer which is effective to modify the polymer in its properties. Generally, a substantial amount is of at least 1% by moles, based on the total moles of recurring units.

As used herein, the term "cation exchange group" has its general meaning as intended in organic chemistry and it encompasses atoms or combination of atoms bonded to the carbon skeleton of the ethylenically unsaturated monomer, which confer to said ethylenically unsaturated monomer ability to trap and release (i.e. exchange) cations in a process called ion exchange. Generally cation exchange groups are negatively charged moieties.

The choice of the cation bound to the negatively charged moiety is not critical, for example, cation exchange groups usually come with sodium ($Na^+$) or hydrogen ($H^+$) ions attached to said exchange sites. Both of these ions have generally low affinities to the sites. It is widely understood that when such exchange sites are exposed to appropriate conditions (e.g. in a reactive environment), cations can be replaced by protons so as to obtain an acid catalysts possessing labile $H^+$.

The fluoroionomer (I) has preferably linked on its cation exchange groups, hydrogen ($H^+$) ions.

Non limitative examples of cation exchange groups are notably those complying with formula:
—$SO_2X$, wherein X is chosen among halogens (Cl, F, Br, I), —$O^-M^+$, wherein $M^+$ is a cation selected among $H^+$, $NH_4^+$, $K^+$, $Li^+$, $Na^+$, or mixtures thereof; preferably X=—$O^-H^+$.
—COY, wherein Y is chosen among halogens (Cl, F, Br, I); —$O^-M^+$, wherein $M^+$ is a cation selected among $H^+$, $NH_4^+$, $K^+$, $Li^+$, $Na^+$; —$OR_{Hy}$ wherein $R_{Hy}$ is a $C_1$-$C_6$ hydrocarbon group; —$OR_{Hf}$ wherein $R_{Hf}$ is a $C_1$-$C_6$ fluorocarbon or per(halo)fluorocarbon group; —$N(R_{Hy*})_2$, wherein $R_{Hy}$*, equal or different at each occurrence, is hydrogen or a $C_1$-$C_6$ hydrocarbon group, or mixtures thereof; preferably Y=—O⁻H⁺.

—$PO_2Z$, wherein Z is chosen among halogens (Cl, F, Br, I); —O⁻M⁺, wherein M⁺ is a cation selected among H⁺, $NH_4^+$, K⁺, Li⁺, Na⁺; —$OR_{Hy}$ wherein $R_{Hy}$ is a $C_1$-$C_6$ hydrocarbon group, and —$OR_{Hf}$ wherein $R_{Hf}$ is a $C_1$-$C_6$ fluorocarbon or per(halo)fluorocarbon group, or mixture thereof; preferably Z=—O⁻H⁺.

Should the functional monomer comprise [in addition to fluorine atoms optionally comprised in the functional group] at least one fluorine atom which is not comprised in the functional group, it is designated as fluorinated functional monomer. Should the functional monomer be free of fluorine atoms other than those optionally comprised in the functional group, it is designated as hydrogenated functional monomer.

The fluorinated monomer and the fluorinated functional monomer may be the same monomer or may be different monomers, that is to say that the fluoroionomer (I) can be a homopolymer of a fluorinated functional monomer, or can be a copolymer of one or more than one fluorinated monomer and one or more than one functional monomer, fluorinated or hydrogenated.

Preferably, the fluoroionomer (I) comprises recurring units derived from at least one fluorinated functional monomer chosen among:

(M1) Sulfonated Perfluoroolefin of Formula (M1):

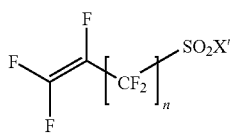

wherein n is an integer between 0 and 6 and x' is chosen among halogens (Cl, F, Br, I), —O⁻M⁺, wherein M⁺ is a cation selected among H⁺, $NH_4^+$, K⁺, Li+, Na⁺, or mixtures thereof, preferably X'=—O⁻H⁺; preferred sulfonated perfluoroolefin are those complying with formulae (M1-A) and (M1-B):

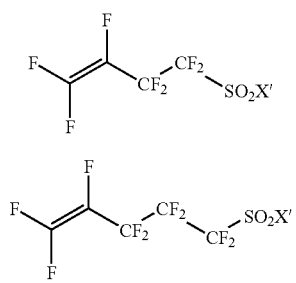

wherein X' has the same meaning as above defined;

(M2) Sulfonated Perfluorovinylethers of Formula (M2):

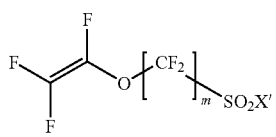

wherein m is an integer between 1 and 10 and X' is chosen among halogens (Cl, F, Br, I), —O⁻M⁺, wherein M⁺ is a cation selected among H⁺, $NH_4^+$, K⁺, Li⁺, Na⁺, or mixtures thereof, preferably X'=—O⁻H⁺; preferred are sulfonated perfluorovinylethers of formulae (M2-A), (M2-B) and (M2-C):

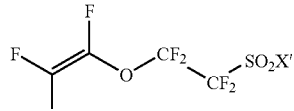

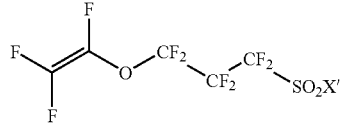

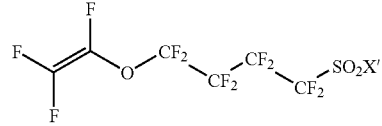

wherein X' has the same meaning as above defined; most preferably, the sulfonated perfluorovinylether is perfluoro-5-sulphonylfluoride-3-oxa-1-pentene (also known as "SFVE") of formula (M2-D):

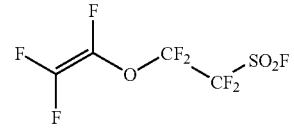

which can be in its —$SO_2F$ form or, preferably, in any of the —$SO_2X'$ forms, as above detailed, more preferably in its —$SO_3H$ form.

(M3) Sulfonated Perfluoroalkoxyvinylethers of Formula (M3):

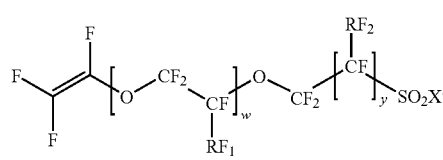

wherein w is an integer between 0 and 2, $RF_1$ and $RF_2$, equal or different from each other and at each occurrence, are independently —F, —Cl or a $C_{1-10}$ perfluoroalkyl group, optionally substituted with one or more ether oxygens, y is an integer between 0 and 6 and X' is chosen among H, halogens (Cl, F, Br, I), —O⁻M⁺, wherein M⁺ is a cation selected among H⁺, $NH_4^+$, K⁺, Li⁺, Na⁺, or mixtures thereof; preferably X' is —O⁻H⁺; preferred sulfonated perfluoroalkoxyvinylether complies with formula (M3) here above, wherein w is 1, $RF_1$ is —$CF_3$, y is 1 and $RF_2$ is —F and X' is F [formula (M3-A), also called "PSEPVE" (perfluoro-2-(2-fluorosulfonylethoxy)propylvinyl ether)]:

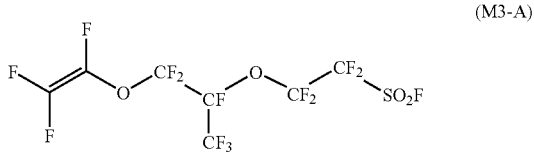

(M3-A)

which can be in its —SO$_2$F form or, preferably, in any of the —SO$_2$X' forms, as above detailed, more preferably in its —SO$_3$H form.

(M4) Perfluoroalkoxyvinylether Carboxylates of Formula (M4):

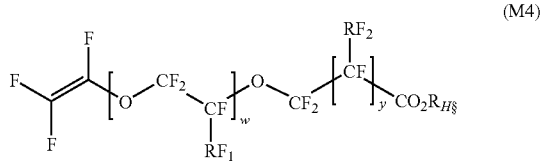

(M4)

wherein w, y, RF$_1$ and RF$_2$ have the same meaning as above defined, and R$_{H\S}$ is a C$_{1-10}$ alkyl or fluoroalkyl group; preferred perfluoroalkoxyvinylether carboxylate complies with formula (M4) here above, wherein w is 0, y is 2, R$_{H\S}$ is methyl and RF$_2$ is —F [formula (M4-A)]:

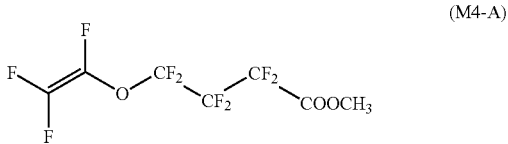

(M4-A)

(M5) Sulfonated Aromatic (Per)Fluoroolefins of Formula (M5):

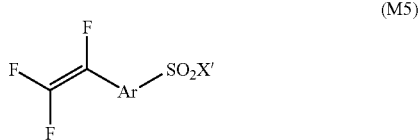

(M5)

wherein Ar is a C$_{3-15}$ aromatic or heteroaromatic moiety and X' is chosen among halogens (Cl, F, Br, I), —O$^-$M$^+$, wherein M$^+$ is a cation selected among H$^+$, NH$_4^+$, K$^+$, Na$^+$, or mixtures thereof, preferably X'=—O$^-$H$^+$; and (M6) Mixtures Thereof.

Optionally, in addition to recurring units derived from fluorinated monomer(s) and functional monomer(s) as above specified, the fluoroionomer can further comprise recurring units derived from bis-olefins of formula:

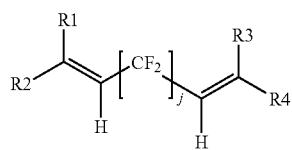

wherein j is an integer between 2 and 10, preferably between 4 and 8, and R, R2, R3, R4, equal or different from each other, are H or C$_{1-5}$ alkyl or fluoroalkyl groups.

Should the fluoroionomer comprise recurring units derived from a bis-olefin as above defined, it advantageously comprises said recurring units in an amount in the range from 0.01 to 5% by moles, with respect to all recurring units of fluoroionomer.

Preferably, the fluoroionomer is free from recurring units derived from bis-olefins as above specified.

The fluoroionomer is preferably a per(halo)fluoroionomer.

For the purpose of the invention, the term "per(halo)fluoroionomer" is intended to denote a fluoroionomer substantially free of hydrogen atoms.

The term "substantially free of hydrogen atom" is understood to mean that the per(halo)fluoroionomer consists essentially of:
  recurring units derived from one or more than one ethylenically unsaturated monomer comprising at least one fluorine atom and free from hydrogen atoms (per(halo)fluoromonomer, hereinafter); and
  recurring units derived from one or more than one ethylenically unsaturated monomer comprising at least one fluorine atom and at least one cation exchange group, and free from hydrogen atoms (except those optionally comprised in the cation exchange group) (functional per(halo)fluoromonomer, hereinafter).

The per(halo)fluoromonomer and the functional per(halo)fluoromonomer may be the same monomer or may be different monomers, that is to say that the per(halo)fluoroionomer can be a homopolymer of a functional per(halo)fluoromonomer, or can be a copolymer of one or more than one per(halo)fluoromonomer and one or more than one functional per(halo)fluoromonomer.

Preferred fluoroionomer is chosen among per(halo)fluoroionomer comprising (preferably consisting essentially at) recurring units derived from at least one functional per(halo)fluoromonomer and at least one per(halo)fluoromonomer chosen among:
  C$_3$-C$_8$ perfluoroolefins, preferably tetrafluoroethylene (TFE) and/or hexafluoropropylene (HFP);
  chloro- and/or bromo- and/or iodo-C$_2$-C$_6$ per(halo)fluoroolefins, like chlorotrifluoroethylene (CTFE) and/or bromotrifluoroethylene;
  perfluoroalkylvinylethers (PAVE) complying with formula CF$_2$=CFOR$_{f1}$ in which R$_{f1}$ is a C$_1$-C$_6$ perfluoroalkyl, e.g. —CF$_3$, —C$_2$F$_5$, —C$_3$F$_7$;
  perfluoro-oxyalkylvinylethers complying with formula CF$_2$=CFOX$_0$, in which X$_0$ is a C$_1$-C$_{12}$ perfluorooxyalkyl having one or more ether groups, like perfluoro-2-propoxy-propyl.

More preferred fluoroionomer is chosen among tetrafluoroethylene (TFE) copolymers comprising (preferably consisting essentially at) recurring units derived from at least one functional per(halo)fluoromonomer as above defined.

Preferred functional per(halo)fluoromonomers are notably sulfonated perfluorovinylethers of formula (M2) as above detailed and sulfonated perfluoroalkoxyvinylethers of formula (M3) as above detailed, and mixtures thereof.

Even more preferred fluoroionomer is selected among TFE copolymers comprising (preferably consisting essentially at) recurring units derived from PSEPVE (formula M3-A here above) and/or SFVE (formula M2-D here above), in their —SO$_2$F or —SO$_2$X" form, wherein X" is chosen among halogens (Cl, Br, I), —O$^-$M$^+$, wherein M$^+$ is a cation selected among H$^+$, NH$_4^+$, K$^+$, Li$^+$, Na$^+$, or mixtures thereof; preferably in their —SO$_3$H form.

Still more preferred fluoroionomer (I) is selected among TFE copolymers comprising (preferably consisting essentially of):

from 5 to 30% by moles of recurring units derived from PSEPVE and/or SFVE, in their —$SO_2F$ or —$SO_2X''$ form, wherein X'' is chosen among halogens (Cl, Br, I), —$O^-M^+$, wherein $M^+$ is a cation selected among $H^+$, $NH_4^+$, $K^+$, $Li^+$, $Na^+$, or mixtures thereof; preferably in their —$SO_3H$; and from 95 to 70% by moles of recurring units derived from TFE.

According to a preferred embodiment of the invention, the fluoroionomer (I) is chosen among TFE copolymers as above described wherein the functional monomer is SFVE, in its —$SO_2F$ or —$SO_2X''$ form, wherein X'' is chosen among halogens (Cl, Br, I), —$O^-M^+$, wherein M is a cation selected among $H^+$, $NH_4^+$, $K^+$, $Li^+$, $Na^+$, or mixtures thereof; preferably in its —$SO_3H$ form.

The liquid composition comprises fluoroionomer (I-1) and fluoroionomer (I-2) in a weight ratio (I-1)/(I-2) of at least 2:1, preferably of at least 3:1, most preferably of at least 5:1.

The heat of fusion of fluoroionomer (I-1) and (I-2) is determined according to ASTM D3418.

As specifically provided by this standard, heat of fusion is determined from second heating curve at a heat rate of 10° C./min, after having suppressed effects of thermal history of the sample in a first heating cycle and subsequent cooling in well-defined conditions.

When the fluoroionomer (I) comprises a cation exchange group of formula —$SO_2X$, the heat of fusion is generally determined on the material in its —$SO_2F$ form.

It is essential for fluoroionomer (I-1) to have a heat of fusion comprised between 4 and 20 J/g; this component of the dispersion is deemed to advantageously confer to the membrane the required ion-exchange and mechanical properties. Fluoroionomers (I-1) having heat of fusion of more than 20 J/g, when mixed with fluoroionomer (I-2), fail to provide dispersions having adequate filmability properties because of incomplete dissolution/dispersion of the fluoroionomer (I-1). Fluoroionomers (I-1) having heat of fusion of less than 4 J/g, when mixed with fluoroionomer (I-2), fail to provide film/membranes having adequate mechanical properties by casting of corresponding dispersions.

The fluoroionomer (I-1) has a heat of fusion of preferably at least 4.5, more preferably at least 5 J/g.

The fluoroionomer (I-1) has a heat of fusion of preferably at most 18, more preferably at most 16 J/g.

The Applicant has also found that the fluoroionomer (I-2) shall be substantially amorphous, that is to say having a heat of fusion of less than 4 J/g, and shall have a water extractable fraction as above mentioned.

The fluoroionomer (I-2) has a heat of fusion of preferably at most 3, more preferably at most 2 J/g, more preferably at most 1 J/g.

Failure to comply with the "substantially amorphous" requirement prevents from obtaining appropriate dispersability of mixture of fluoroionomer (I-1) and fluoroionomer (I-2). Failure to comply with the water extractable requirement provides for dispersions which, despite their filmability, yield films and membranes showing unsatisfactory behaviour, e.g. in fuel cell operations.

Equivalent weight (EW) (i.e. grams of fluoroionomer per mole of functional groups) of fluoroionomer (I-1) and (I-2) are not particularly limited, provided that the materials comply with the above mentioned requirements.

It is generally understood that EW will depend upon the particular chemical nature of the polymer.

For those dispersions wherein both fluoroionomer (I-1) and (I-2) are copolymers of TFE and SFVE, as above described, it is generally understood that fluoroionomer (I-1) will have an EW comprised between 720 and 1600, preferably between 760 and 1400, and that fluoroionomer (I-2) will have an EW comprised between 560 and 720, preferably between 600 and 670.

For those dispersions wherein both fluoroionomer (I-1) and (I-2) are copolymers of TFE and PSEPVE, as above described, it is generally understood that fluoroionomer (I-1) will have an EW comprised between 1050 and 1700, preferably between 1050 and 1550, and that fluoroionomer (I-2) will have an EW comprised between 700 and 1050, preferably between 800 and 950.

Water extractable fraction of fluoroionomer (I-2) is preferably of less than 35% wt, more preferably of less than 20% wt.

The Applicant has surprisingly found that behaviour in fuel cell of membranes obtained from the liquid composition of the invention is not only notably related to the EW of fluoroionomer (I-2), but also to its substantially amorphous character and to its microscopic structure responsible of its interaction with water containing environment (including, notably, molecular weight, molecular weight distribution, . . . ), all these properties expressed by the water extractable fraction.

Water extractable fraction can be determined according to the procedure detailed in the examples section, i.e. by determining the fraction solubilised in boiling water (100° C.).

The liquid composition of the invention comprises a liquid medium. Typically, the liquid composition comprises a liquid medium comprising water.

Generally, the liquid composition comprises a water or water/alcoholic mixture as liquid medium, optionally comprising additional ingredients and/or additives. Nevertheless, other liquid media can still be used (DMA, DMF, DMSO, alcohols).

Suitable alcohols which can be used, in particular as water/alcoholic mixture, are notably methanol, ethanol, propyl alcohols (i.e. isopropanol, normalpropanol), ethylene glycol, diethylene glycol.

Good results have been obtained with liquid composition wherein the liquid medium is essentially water or a mixture of water and alcohol, preferably of water and propyl alcohol(s).

The liquid composition of the invention may further comprise additional ingredients/additives.

According to an embodiment of the invention, the liquid composition of the invention is free from catalyst [catalyst (C)]. This liquid composition is particularly useful for the manufacture of membranes.

According to another embodiment of the invention, the liquid composition of the invention further comprises at least one catalyst [catalyst (C)].

The term catalyst (C), in the field of electrochemistry, is intended to denote an electro active metal which advantageously reduces activation energy of a redox chemical reaction; typically such catalyst (C) is chosen among metals, metal alloys and metal oxides, either used as such or supported on a chemically inert, electron conductive material, said support material being notably carbon, graphite or non-electroactive metals.

Suitable catalysts (C) are notably group VIII metals supported on suitable carriers or support materials as above mentioned. Preferably the support is carbon black, more preferably Vulcan® carbon black, acetylene Black® or graphitized carbons.

The catalyst (C) is preferably under the form of particles having an average particle size of 30 to 300000 nm, preferably of 10 to 50000 nm, more preferably of 500 to 10000 nm. It is understood that above mentioned particle size refers to the actual dimension of the particles of said catalyst (C), which are generally under the form of the aggregates of elementary grains.

The liquid composition according to this embodiment can be used as ink for the manufacture of electrodes for fuel cells.

To this aim, the liquid composition according to this embodiment comprises the catalyst (C) and the fluoroionomers (I-1) and (I-2) in a weight ratio catalyst (C)/(fluoroionomers (I-1)+(I-2)) of between 6 and 0.5, preferably of 4 and 0.75.

Another object of the invention is a process for the manufacture of the liquid composition as above described.

The process of the invention preferably comprises mixing the fluoroionomers (I-1) and fluoroionomer (I-2) with the above detailed liquid medium.

Standard mixing devices can be successfully employed in the process of the invention.

According to a first embodiment of the invention, the process comprises advantageously mixing, generally at a temperature of between 5° C. and 80° C., preferably between 20° C. and 60° C., at least a pre-formed liquid composition comprising fluoroionomers (I-1) and at least a pre-formed liquid composition comprising fluoroionomer (I-2). It is understood that liquid compositions of fluoroionomers (I-1) and (I-2) can be prepared by dispersing/solving these latters in a liquid medium, e.g. according to standard methods of the art (see e.g. U.S. Pat. No. 4,433,082 (DUPONT DE NEMOURS) 21 Feb. 1984, GB 1286859 (DU PONT) 23 Aug. 1972, EP 1004615 A (AUSIMONT S.P.A.) 31 May 2000 and U.S. Pat. No. 6,150,426 (DUPONT DE NEMOURS) 21 Nov. 2000).

According to a second embodiment of the invention, the process advantageously comprises mixing by dispersing/solving in a liquid medium a solid mixture of fluoroionomer (I-1) and fluoroionomer (I-2) so as to obtain the inventive liquid composition. Generally, dispersing/solving the solid mixture of fluoroionomer (I-1) and fluoroionomer (I-2) in the liquid mixture is carried out at a temperature of advantageously between 20 and 270° C., preferably between 50 and 250° C., typically following procedures taught in above mentioned references.

Solid mixture of fluoroionomer (I-1) and (I-2) can be manufactured either by mixing powders of fluoroionomer (I-1) and (I-2), said powders obtained from coagulation, post-treatment and drying of, respectively, a latex of fluoroionomer (I-1) and a latex of fluoroionomer (I-2), or by mixing polymerization latexes of fluoroionomers (I-1) and fluoroionomer (I-2), subsequent co-coagulation, post-treatment and drying.

Should the liquid composition further comprise a catalyst (C) as above detailed, generally the process comprises mixing first the fluoroionomers (I-1) and (I-2) with the liquid medium and then mixing the so-obtained mixture with the catalyst (C).

Another object of the invention is the use of the liquid composition of the invention for the manufacture of membranes.

The liquid composition used for the manufacture of membranes is generally free from catalyst (C) as above detailed.

The membrane can be manufactured from the liquid composition of the invention using traditional techniques, including casting, spin coating, spray-coating, dipping or impregnation of porous inert supports. Casting methods are generally preferred for the manufacture of membranes, as they advantageously enable appropriate thickness control.

Optionally, additives can be added to the liquid composition of the invention. Additives may be polymers, such as PTFE or fluoro-elastomers particles or fibrils, or inorganics, such as zeolites and phosphates. These additives are added to the liquid composition before the coating/casting process in order to obtain a composite membrane.

Still another object of the invention is the use of the liquid composition of the invention for the manufacture of electrodes, e.g. electrodes for fuel cells.

The liquid composition suitable for the manufacture of electrodes generally comprises a catalyst (C) as above detailed.

The electrodes are generally manufactured by coating/casting methods. Typically, the electrodes are coated or casted on pre-formed membranes, generally on both sides thereof, so as to obtain so-called membrane electrodes assemblies (MEAs).

Optionally, the electrodes can be cast on an inert, non porous, support and then transferred, after solvent evacuation, on a membrane film according to the so-called DECAL technique.

Optionally, the electrodes can be cast on a gas diffusion media that is assembled with the membrane with a hot pressing technique after solvent evaporation, according to the so-called GDE approach.

Still objects of the invention are the membranes, the electrodes and the MEAs manufactured from the liquid composition of the invention, as well as fuel cells comprising said membranes, electrodes and MEAs.

The invention will now be explained with reference to the following examples, whose purpose is merely illustrative and not intended to limit the scope of the invention.

Determination of the Heat of Fusion of the Fluoroionomer

The heat of fusion of fluoroionomers was determined according to ASTM D3418, as heat of second fusion.

Determination of the Equivalent Weight of the Fluoroionomer

An aliquot of the fluoroionomer latex was coagulated by freezing and thawing and the recovered polymer was washed with water and dried for 40 h at 150° C. A film was then manufactured by compression molding (270° C. for 5 minutes) said powder. A 10 cm×10 cm square sample was punched out of said film and treated for 24 hr at 80° C. in a KOH solution in water (10% wt), rinsed with pure water, and further treated with a 20% by weight aqueous $HNO_3$ solution at room temperature, and finally rinsed with pure water. The polymer so converted from the —$SO_2F$ form to the corresponding acid —$SO_3H$ form was dried in vacuum at 150° C. and titrated with diluted NaOH. Equivalent weight was then determined as ratio between the weight of fluoroionomer and number of equivalents of acid groups.

PREPARATIVE EXAMPLE 1

Manufacture of Fluoroionomers (Fl-1) Fluoroionomer Having Undetectable Heat of Fusion of ~0 J/g In a 5 liters autoclave the following reagents were charged:
2.1 liters of demineralized water;
255 g of the monomer with formula: $CF_2$=CF—O—$CF_2CF_2$—$SO_2F$
600 g of a 5% weight solution of $CF_2ClO(CF_2CF(CF_3)O)_n(CF_2O)_mCF_2$ COOK (PFPE surfactant) in water with an average molecular weight of 521 and the ratio n/m=10.

The autoclave, stirred at 650 rpm, was heated to a temperature of 60° C. 100 ml of a water based solution containing 16 g/liter of KPS (potassium persulfate) was then added. The pressure was kept to 7 Bar abs by addition of $CO_2$. The pressure was then maintained at a value of 12 Bar abs by feeding TFE.

After addition of 150 g of TFE in the reactor, 76 g of the monomer $CF_2$=CF—O—$CF_2CF_2$—$SO_2F$ were added every 25 g of TFE fed to the autoclave. The reaction was stopped after 312 min, stirring was interrupted, the autoclave was cooled and residual unreacted TFE was vented. A total of 500 g of TFE were fed.

So obtained latex was found to have a solids content of 26.8% by weight. The latex was kept under nitrogen bubbling for 16 hours to strip away residual monomers from the polymerization, and then coagulated by freezing and thawing; the recovered polymer was washed with water, dried in oven, and analyzed by DSC. The polymer was found to possess by DSC analysis an undetectable heat of fusion (~0 J/g) and an EW of 450.

(Fl-2) Fluoroionomer Having Undetectable Heat of Fusion

The procedure as described herein above for (Fl-1) was repeated, but using a 22 liters autoclave containing an initial charge of 11.5 liters of demineralized water, 980 g of $CF_2$=CF—O—$CF_2CF_2$—$SO_2F$, and 3100 g of the PFPE surfactant solution, starting reaction by addition of 150 ml of 6 g/l KPS solution, with no addition of $CO_2$ and with a constant pressure of TFE of 9 Bar abs.

After addition of 1000 g of TFE in the reactor, 237 g of $CF_2$=CF—O—$CF_2CF_2$—$SO_2F$ were added every 200 g of TFE fed to the autoclave, until a total of 4 000 g of TFE were fed (276 min).

So obtained latex was found to have a solids content of 27.2% wt.

Coagulated and dried polymer isolated therefrom was found to possess by DSC analysis an undetectable heat of fusion (~0 J/g) and an EW of 630.

(Fl-3) Fluoroionomer Having Heat of Fusion of 5.1 J/g

Same procedure as detailed for the manufacture of (Fl-2) was followed, but a constant pressure of 12 Bar abs was maintained by addition of TFE. After addition of 1200 g of TFE in the reactor, 220 g of $CF_2$=CF—O—$CF_2CF_2$—$SO_2F$ were added every 200 g of TFE fed to the autoclave, until a total of 4 000 g of TFE were fed (256 min).

So obtained latex was found to have a solids content of 27.5% wt.

Coagulated and dried polymer isolated therefrom was found to possess by DSC analysis a heat of fusion of 5.1 J/g and an EW of 810.

(Fl-4) Fluoroionomer Having Heat of Fusion of 6.4 J/g

Same procedure as detailed for the manufacture of (Fl-3) was followed, but a constant pressure of 13.5 Bar abs was maintained by addition of TFE.

After addition of 1000 g of TFE in the reactor, 175 g of $CF_2$=CF—O—$CF_2CF_2$—$SO_2F$ were added every 200 g of TFE fed to the autoclave, until a total of 4 000 g of TFE were fed (233 min).

So obtained latex was found to have a solids content of 28.5% wt.

Coagulated and dried polymer isolated therefrom was found to possess by DSC analysis a heat of fusion of 6.4 J/g and an EW of 870.

(Fl-5) Fluoroionomer Having Heat of Fusion of 12.7 J/g

Same procedure as detailed for the manufacture of (Fl-4) was followed, but a constant pressure of 15.5 Bar abs was maintained by addition of TFE.

After addition of 1000 g of TFE in the reactor, 175 g of $CF_2$=CF—O—$CF_2CF_2$—$SO_2F$ were added every 220 g of TFE fed to the autoclave, until a total of 4 000 g of TFE were fed (150 min).

So obtained latex was found to have a solids content of 27% wt.

Coagulated and dried polymer isolated therefrom was found to possess by DSC analysis a heat of fusion of 12.7 J/g and an EW of 1100.

(Fl-6) Fluoroionomer Having Heat of Fusion of 26.5 J/g

Same procedure as detailed for the manufacture of (Fl.5) was followed, but after addition of 1200 g of TFE in the reactor, 175 g of $CF_2$=CF—O—$CF_2CF_2$—$SO_2F$ were added. After this addition, 175 g of $CF_2$=CF—O—$CF_2CF_2$—$SO_2F$ were added every 280 g of TFE fed to the autoclave, until a total of 4 000 g of TFE were fed (132 min).

So obtained latex was found to have a solids content of 29% wt.

Coagulated and dried polymer isolated therefrom was found to possess by DSC analysis a heat of fusion of 26.5 J/g and an EW of 1800.

(Fl-7) Fluoroionomer Having Heat of Fusion of ~0 J/g

Same procedure as for (Fl-1) was followed, but using 1400 g of perfluoro-3,6-dioxa-4-methyl-7-octenesulfonic acid of formula $CF_2$=CF—O—$CF_2$—$CFCF_3$—O—$CF_2CF_2$—$SO_2F$ and 720 g of the PFPE surfactant solution. The pressure was kept to 7 Bar abs by addition of $CO_2$. The pressure was then maintained at 12 Bar abs by feeding TFE with no further feed of PSEPVE.

The reaction was stopped after 312 min, stirring was interrupted, the autoclave was cooled and residual unreacted TFE was vented. A total of 300 g of TFE were fed.

The so-obtained latex was found to possess a solids concentration of 27.3% by weight.

Coagulated and dried polymer isolated therefrom was found to possess by DSC analysis an undetectable heat of fusion (~0 J/g) and an EW of 650.

EXAMPLE 3

Determination of the Water Extractable Fraction

The fluoroionomers Fl-1 to Fl-7, obtained as detailed in example 1, in their $SO_3H$ form, were characterized for their water extractable fraction, following procedure detailed here below. A specimen of 100 gr of dry fluoroionomer was mixed with 900 gr of demineralised water and brought to reflux under stirring for 4 hours at 100° C. Then, stirring was interrupted and the so-obtained mixture was allowed to cool down to room temperature overnight, so as to yield a biphasic solid/liquid system. Only Fl-1 and Fl-7 gave a homogeneous liquid phase.

Liquid phase was then separated and an aliquot (10 gr) of said liquid phase was analyzed using a thermo gravimetrical balance (160° C. for 60 minutes) for its solids content.

Results (=grams of polymer extracted in the whole liquid phase/grams of polymer at beginning of test), expressed as gr of water extractable fraction percent are summarized in following table, together with corresponding heats of fusion.

TABLE 1

| Fluoroionomer | FI-1 | FI-2 | FI-3 | FI-4 | FI-5 | FI-6 | FI-7 |
|---|---|---|---|---|---|---|---|
| $\Delta_f H$ (J/g) | ~0 | ~0 | 5.1 | 6.4 | 12.7 | 26.5 | ~0 |
| EW (eq/g) | 450 | 630 | 810 | 870 | 1100 | 1800 | 650 |
| $H_2O$ extractable fraction (% wt) | 100 | 17.1 | 3.5 | 2.1 | 0.2 | 0.1 | 100 |

EXAMPLE 3

Manufacture of Hydro-Alcoholic Dispersions of Fluoroionomers of Example 1

The fluoroionomers (Fl-1) to (Fl-7) were hydrolysed by treatment in a KOH aqueous solution (10% wt) at 80° C. for 16 hours followed by washing in demineralised water. The complete conversion of the precursors (—$SO_2F$) form to the salt (—$SO_3K$) forms was checked by IR analysis. The polymers were than treated in 20% nitric acid solution at ambient temperature for 1 hour in order to convert the polymers in (—$SO_3H$) forms and then washed several times in demineralised water until the pH of water was found to be higher than 5.

Five different dispersions were than produced by dissolving at 45° C. for three hours different polymers in 2 liters of a solvents mixture consisting of:
20% by weight water
40% by weight 1-propyl alcohol
40% by weight 2-propyl alcohol (mixture (M-1)).

The compositions of the dispersions were the following:

TABLE 2

| Dispersion i.d. | Composition |
| --- | --- |
| D1 (comparative) | 7% wt of FI-3 in mixture (M – 1) |
| D2 | 0.9% wt of FI-2 + 6.1% wt FI-4 in mixture (M – 1) |
| D3 (comparative) | 0.9% wt of FI-1 + 6.1% wt FI-5 in mixture (M – 1) |
| D4 (comparative) | 1.8% wt of FI-1 + 5.2% wt FI-6 in mixture (M – 1) |
| D5 (comparative) | 0.9% wt of FI-7 + 6.1% wt FI-4 in mixture (M – 1) |

Dispersion D4 comprised solid residues which were not completely solved/dispersed in mixture (M-1). Therefore, D4 was not analyzed further.

The polymer used for the dispersion D4 did not completely dissolve during preparation and some solid remained in the vessel, D4 was not further analyzed.

On the other side, fluoroionomers employed for manufacture of dispersions D1 to D3 and D5 completely dissolved/dispersed in mixture (M-1).

EXAMPLE 4

Preparation and Characterization of Cast Membrane with the Dispersion of Ex 3

The dispersions D1, D2, D3, D5 were deposited on a planar glass surface with a casting knife (Braive®) with a knife thickness of 900 micron. After evaporation (70° C. in ventilated oven), a continuous/consistent film was obtained after solvent evaporation in case of dispersion D2, D3 and D5. In case of dispersion D1, the surface of the film was found to be irregular, due to the presence of few cracks and holes.

The films produced from dispersion D2, D3 and D5 were than annealed at a temperature of 180° C. for 15 minutes for producing respectively the membranes Me-2 and Me-3 and Me-5.

The membranes Me-2, Me-3 and Me-5 were than assembled in two single cells (Fuel Cell Technology®) with an active area of 25 $cm^2$ and tested on a Arbin® 50W test stand. The membranes were assembled with E-TEK® LT250EW gas diffusion electrode with 0.5 mg/$cm^2$ Pt treated with ionomer on the surface. The test operating conditions were fixed as follow:
reactants stoichiometry: 2.8 Air-3.4 Hydrogen (pure hydrogen 5.5 grade);
reactant humidity level: 100%;
cell temperature: 75° C.;
operating pressure: 2.5 Bar Abs The voltage of the fuel cell was kept at the constant value of 0.6 V; every 200 hours of operations, the hydrogen crossover current of the membrane was monitored with methods well-known in the art (see Journal of Power Sources, 171/1 (2007) 140-147).

In the table below the hydrogen crossover current density values are expressed in terms of hydrogen oxidation current density; after 600 hours, the tests of M3 and M5 were stopped because of excessive hydrogen oxidation current density.

TABLE 3

| Elapsed time (hrs) | Hydrogen crossover current density [mA/$cm^2$] | | |
| --- | --- | --- | --- |
| | Me-2 fuel cell | Me-3 fuel cell | Me-5 fuel cell |
| 0 | 1.2 | 1.3 | 1.2 |
| 200 | 1.3 | 3.5 | 4 |
| 400 | 1.2 | 12 | 15 |
| 600 | 1.4 | 54 | 98 |
| 800 | 1.2 | | |
| 1000 | 1.2 | | |
| 2000 | 1.6 | | |

EXAMPLE 5

Preparation of Catalytic Inks and Electrodes with the Dispersions D1 to D3

The dispersions D1, D2, D3 were mixed with a Pt/C catalyst (50% of Pt from Tanaka, Japan) in a weight ratio catalyst/fluoroionomer 3:1 by stirring at room temperature and sonicating until obtaining a uniform dispersion.

The three inks produced with the dispersion D1, D2, D3 were deposited on a planar glass surface with a casting knife (Braive®) with a knife thickness of 100 micron. In case of inks from D2 and D3, continuous/consistent films were obtained after solvent evaporation (65° C. in ventilated oven for 30 minutes). In case of ink derived from dispersion D1, the surface of the film was not continuous and few cracks were present.

The invention claimed is:
1. A liquid composition comprising:
at least one fluoroionomer (I-1), said fluoroionomer (I-1) having a heat of fusion comprised between 4 and 20 J/g; and
at least one fluoroionomer (I-2), said fluoroionomer (I-2) being substantially amorphous, having a heat of fusion of less than 4 J/g, and wherein a water extractable fraction of said fluoroionomer (I-2) is less than 40% wt, said liquid composition comprising said fluoroionomer (I-1) and said fluoroionomer (I-2) in a weight ratio (I-1)/(I-2) of at least 2:1.
2. The liquid composition of claim 1, wherein the fluoroionomer (I-1) and the fluoroionomer (I-2), comprise recur- ring units derived from at least one fluorinated functional monomer each independently selected from the group consisting of:

(M1) sulfonated perfluoroolefin of formula (M1):

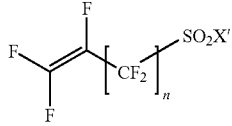

(M1)

wherein n is an integer between 0 and 6; and X' is selected from the group consisting of Cl, F, Br, I, —O$^-$M$^+$, and mixtures thereof, wherein M$^+$ is a cation selected from the group consisting of H$^+$, NH$_4^+$, K$^+$, Li$^+$, and Na$^+$;

(M2) sulfonated perfluorovinylethers of formula (M2):

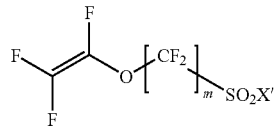

(M2)

wherein m is an integer between 1 and 10; and X' is selected from the group consisting of Cl, F, Br, I, —O$^-$M$^+$, and mixtures thereof, wherein M+ is a cation selected from the group consisting of H$^+$, NH$_4^+$, K$^+$, Li$^+$, and Na$^+$;

(M3) sulfonated perfluoroalkoxyvinylethers of formula (M3):

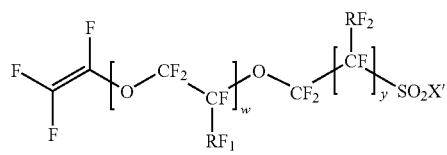

(M3)

wherein w is an integer between 0 and 2; RF$_1$ and RF$_2$, equal to or different from each other and at each occurrence, are independently —F, —Cl or a C$_{1-10}$ perfluoroalkyl group, optionally substituted with one or more ether oxygens; y is an integer between 0 and 6; and X' is selected from the group consisting of Cl, F, Br, I, —O$^-$M$^+$, and mixtures thereof, wherein M$^+$ is a cation selected from the group consisting of H$^+$, NH$_4^+$, K$^+$, Li$^+$, and Na$^+$ (M4) perfluoroalkoxyvinylether carboxylates of formula (M4):

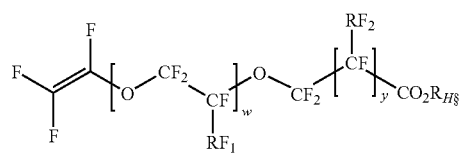

(M4)

wherein w, y, RF$_1$ and RF$_2$ have the same meaning as defined for M3; and R$_{H\S}$ is a C$_{1-10}$ alkyl or fluoroalkyl group;

(M5) sulfonated aromatic (per)fluoroolefins of formula (M5):

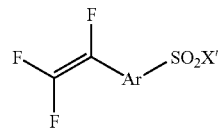

(M5)

wherein Ar is a C$_{3-15}$ aromatic or heteroaromatic moiety; and X' is selected from the group consisting of Cl, F, Br, I, —O$^-$M$^+$, and mixtures thereof, wherein M$^+$ is a cation selected from the group consisting of H$^+$, NH$_4^+$, K$^+$, Li$^+$, and Na$^+$; and (M6) mixtures thereof.

3. The liquid composition of claim 2, wherein the fluoroionomer (I-1) and the fluoroionomer (I-2), comprise recurring units derived from at least one fluorinated functional monomer each independently selected from the group consisting of:

(M1) sulfonated perfluoroolefin of formula (M1) selected from those complying with formulae (M1-A) and (M1-B):

wherein X' is selected from the group consisting of Cl, F, Br, I, —O$^{-M+}$, and mixtures thereof, M$^+$ being a cation selected from the group consisting of H$^+$, NH$_4^+$, K$^+$, Li$^+$, and Na$^+$,

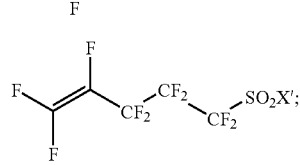

(M1-A)

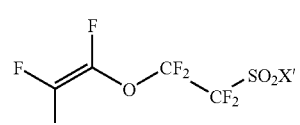

(M1-B)

(M2) sulfonated perfluorovinylethers of formula (M2) selected from the group of formulae consisting of (M2-A), (M2-B), (M2-C) and (M2-D) (perfluoro-5-sulphonylfluoride-3-oxa-1-pentene, known as "SFVE"):

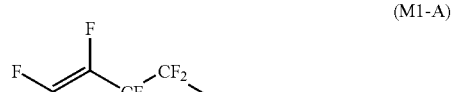

(M2-A)

(M2-B)

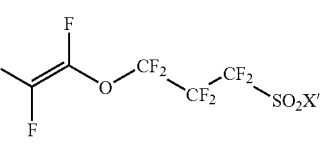

(M2-C)

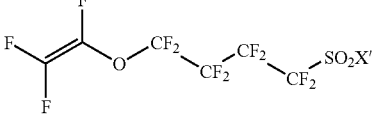

-continued

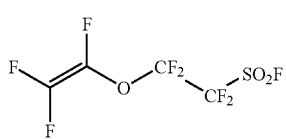
(M2-D)

wherein X' has the same meaning as above;
(M3) sulfonated perfluoroalkoxyvinylether of formula (M3) which is perfluoro-2-(2-fluorosulfonylethoxy)propylvinyl ether (M3-A), called "PSEPVE":

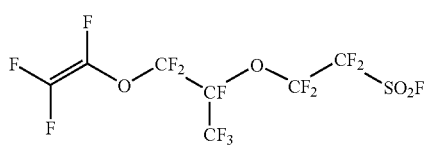
(M3-A)

which is in its —SO$_2$F form or in any of the —SO$_2$X' forms, wherein X' has the same meaning as above; and
(M4) perfluoroalkoxyvinylether carboxylate of formula (M4) which is (M4-A):

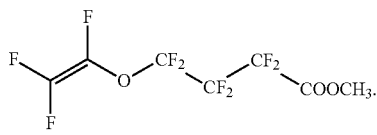
(M4-A)

4. The liquid composition of claim 3, wherein the fluoroionomer (I-1) and the fluoroionomer (I-2), are each independently selected among tetrafluoroethylene (TFE) copolymers comprising:
from 5 to 30% by moles of recurring units derived from perfluoro-2-(2-fluorosulfonylethoxy)propylvinyl ether (PSEPVE) and/or perfluoro-5-sulphonylfluoride-3-oxa-1-pentene (SFVE), in their —SO$_2$F or —SO$_2$X" form, wherein X" is selected from the group consisting of Cl, F, Br, I, —O$^-$M$^+$, and mixture thereof, wherein M$^+$ is a cation selected from the group consisting of H$^+$, NH$_4^+$, K$^+$, Li$^+$, and Na$^+$; and
from 95 to 70% by moles of recurring units derived from TFE.

5. The liquid composition of claim 4, wherein the fluoroionomer (I-1) and the fluoroionomer (I-2), are each independently chosen among the TFE copolymers wherein the functional monomer is SFVE, in its —SO$_2$F or —SO$_2$X" form, wherein X" is selected from the group consisting of Cl, F, Br, I, —O$^-$M$^+$, and mixture thereof, wherein M$^+$ is a cation selected from the group consisting of H$^+$, NH$_4^+$, K$^+$, Li$^+$, and Na$^+$.

6. The liquid composition of claim 1, wherein the fluoroionomer (I-1) has a heat of fusion of at least 5 J/g.

7. The liquid composition of claim 1, wherein the fluoroionomer (I-1) has a heat of fusion of at most 16 J/g.

8. The liquid composition of claim 1, wherein the water extractable fraction of the fluoroionomer (I-2) is of less than 20% wt.

9. The liquid composition of claim 1, said liquid composition comprising the fluoroionomer (I-1) and the fluoroionomer (I-2) in a weight ratio (I-1)/(I-2) of at least 5:1.

10. A process for the manufacture of the liquid composition according to claim 1, comprising mixing the fluoroionomer (I-1) and fluoroionomer (I-2) with a liquid medium.

11. A method of manufacturing membranes or electrodes comprising depositing the liquid composition according to claim 1 on a surface.

12. A product selected from the group consisting of membranes, electrodes, and a membrane electrodes assemblies (MEAs), said product being manufactured from the liquid composition according to claim 1.

13. Fuel cells comprising the product of claim 12 selected from the group consisting of membranes, electrodes, and MEAs.

* * * * *